Sept. 15, 1959 A. FENER 2,904,100
SEALING MEMBER FOR HEAT SEALING MACHINES
Filed May 8, 1956
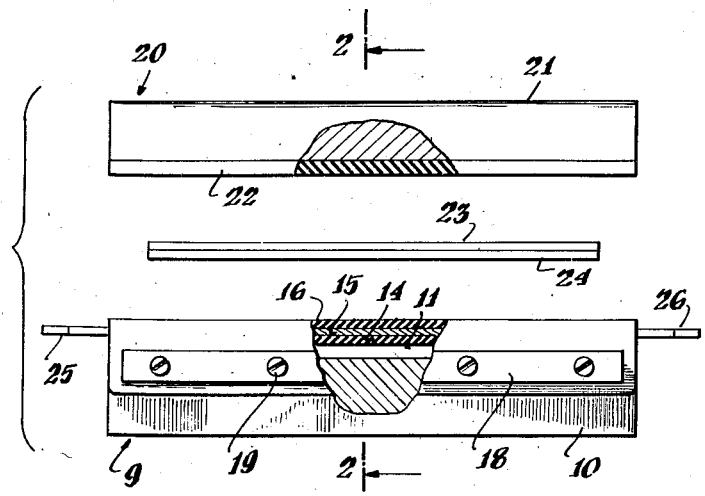
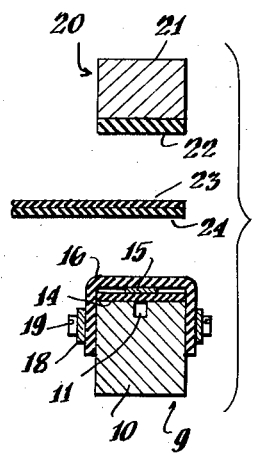
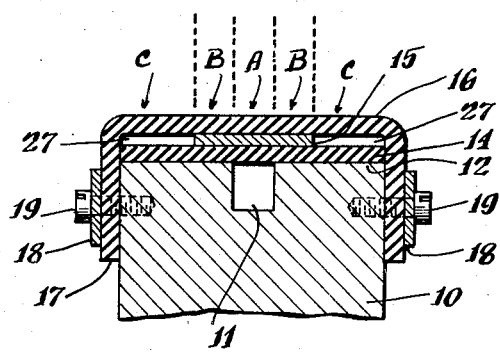
INVENTOR
Alfred Fener
BY
ATTORNEY

United States Patent Office 2,904,100
Patented Sept. 15, 1959

2,904,100

SEALING MEMBER FOR HEAT SEALING MACHINES

Alfred Fener, Brooklyn, N.Y., assignor to Nicholas Langer, New York, N.Y.

Application May 8, 1956, Serial No. 583,459

6 Claims. (Cl. 154—42)

This invention relates to the art of heat sealing thermoplastic materials, and, more particularly, to a novel and improved sealing device or bar for heat sealing machines of the thermal impulse type.

As disclosed in Langer Patent 2,460,460, heat sealing machines of the thermal impulse type essentially comprise a pair of pressure members or bars and a reciprocating mechanism therefor whereby pressure may be applied upon two or more layers of thermoplastic film to be heat sealed interposed therebetween. Examples of the commercially most important thermoplastic films are Pliofilm (rubber hydrochloride), Vinylite (a copolymer of vinyl chloride and vinyl acetate), Polythene (polyethylene), and Saran (vinylidene chloride). A heater element in the form of a thin and narrow strip of a metal of high specific resistance, such as a suitable nickel-chromium alloy known in the trade as Nichrome, is mounted on the face of at least one of said bars, constituting the operating or sealing face of the machine. Sealing pulses of electric current may be passed through the said heater element under the control of a switching mechanism, the operation of which is coordinated to that of the reciprocating mechanism of the bars.

During the operation of the machine, operation of the switching mechanism is initiated substantially when the pressure members arrive into their pressure-applying position. A short pulse of current is then passed through the heater element; which, as a result of its low heat capacity, is heated to heat sealing temperature in a small fraction of a second. The heat thus produced is immediately transferred by surface contact to the region of the thermoplastic layers compressed between the bars, causing heat sealing thereof. A short period thereafter, the heat produced by the pulse of current is dissipated and the seal is cooled and consolidated under pressure whereby a strong and sound seal is obtained.

Heat sealing machines of the thermal impulse type provide important advantages over the conventional heat sealing machines in which the sealing member is continuously maintained at a constant sealing temperature. Due to the fact that the thermal impulse principle permits the sealed region to cool and to consolidate under pressure, the quality of the seal is greatly improved. Also, the thermal impulse principle makes it possible to readily seal films of materials, which cannot be sealed on an industrial scale with sealing members continuously maintained at a constant sealing temperature, such as particularly Polythene (polyethylene) and Saran (vinylidene chloride).

Although heat sealing machines of the thermal impulse type provided excellent results and achieved remarkable commercial success within a short period after their introduction, certain practical difficulties were experienced, particularly when adapting the principle to high speed operation. One of these difficulties was the building up of residual heat in the heater element or sealing strip and its associated supporting structure. Another difficulty consisted in extrusion of the plastic film in the region directly adjoining the seam due to the application of unduly high pressures to the softened thermoplastic layers. Both of these difficulties would, under certain conditions, cause the adherence or sticking of the sealed layers to the operating face of the sealing member or bar after the sealing operation and would interfere with the desired high operating speeds, the obtaining of which is the present trend in the packaging industry.

I have discovered that the outstanding problem may be solved in a remarkably simple manner.

It is an object of the present invention to improve heat sealing machines of the thermal impulse type.

It is another object of the present invention to provide a heat sealing machine of the thermal impulse type in which provision is made for efficient withdrawal of the residual heat present in the seal, and in the sealing bar and its associated structure after each sealing cycle.

It is also within the contemplation of the invention to provide a novel and improved sealing device or bar for heat sealing machines of the thermal impulse type which is capable of being operated equally well at low and at high speeds in the complete absence of sticking and which permits the production of perfect seals at practically any commercially required speed.

The invention also contemplates a novel heat sealing bar of the thermal impulse type comprising means for effectively preventing adherence or sticking of the sealed region thereto after the sealing cycle, which is simple in structure, is characterized by a long useful life and which may be readily manufactured and sold on a practical and commercial scale at a low cost.

Other and further objects and advantages of the present invention will become apparent from the following description, taken in conjunction with the accompanying drawing, in which:

Fig. 1 is a side elevational view, somewhat fragmentary in character and having parts in section, of a preferred embodiment of the invention;

Fig. 2 is a section taken on line 2—2 of Fig. 1; and

Fig. 3 is a view similar to the lower portion of Fig. 2, showing a fragmentary section of the sealing member on a greatly enlarged scale.

Broadly stated, according to the principles of my invention, I provide a sealing device or member comprising a base or bar made of metal of high heat conductivity, such as copper, brass, or aluminum. The operating face of this bar has a longitudinally extending groove or slit therein and is covered with a thin layer of heat-resistant insulation, for example, a Fiberglas (glass fiber) fabric impregnated with Teflon (tetra-fluoro-ethylene). On this layer, there is tensioned a heater element in the form of a strip or band made of a metal or alloy of high specific resistivity, such as Nichrome. The heater element is of a greater width than that of the slit in the base and is so arranged that it overlies the slit with its lateral edges preferably extending by a uniform distance beyond the said slit. A second thin layer of heat-resistant insulation is mounted over the heater element and constitutes the operating or sealing face of the device.

I have found that the operating or sealing face of a sealing member having the described structure is characterized by a transversely non-uniform distribution of heat when passing a heating pulse or current through its heater element. Thus, the longitudinal center portion of the sealing face, which is directly above the longitudinally extending slit in the base, is heated to the highest temperature due to the fact that very little heat is withdrawn therefrom downwardly into the base which is cut out in that longitudinal region. On the other hand, the longitudinal regions of the sealing face adjacent to and at both sides of the said center portion will be heated to a considerably lower temperature due to the presence of relatively short heat conducting paths from the corresponding regions of the heater element into the directly underlying metal base through the interposed thin layer of insulation. The particular distribution of heating temperatures transversely of the operating face of the sealing member provides important practical advantages, which will become apparent more fully as the description proceeds.

Referring now more particularly to the drawing, diagrammatically illustrating a preferred embodiment of the invention, reference numeral 9 generally designates the sealing member comprising a base or bar 10 of high heat conductivity metal having a groove or slit 11 extending longitudinally in the center of its operating face 12. A thin layer 14 of heat-resistant insulation is provided over the entire operating face of the said bar.

A heater element 15 in the form of a thin strip of Nichrome is tensioned by suitable means (not shown) on insulating layer 14, overlying groove 11. As it will be best observed in Fig. 3, heater element 15 is substantially wider than groove 11 and its lateral marginal portions extend a considerable and preferably uniform distance beyond the edges of the said groove. A second layer 16 of heat-resistant insulation is provided on top of the heater element 15 and constitutes the operating and sealing face of the device. This layer of insulation is wider than base 10 and has its lateral marginal portions 17 folded down against the sides of base 10 and secured thereto by means of superposed metal clamping plates 18 and screws 19.

The sealing member just described cooperates with a pressure member 20, comprising a metal base or bar 21 having a layer 22 of a heat-resistant elastomer, such as a suitable grade of silicone rubber, secured thereto, said layer constituting the operating or pressure applying face of the member.

From the foregoing description, the operation of the improved sealing member or bar of the invention will be readily understood by those skilled in the art. It is to be observed in this connection that the novel sealing member is preferably used in a heat sealing machine of the thermal impulse type, such as the one disclosed in the above-mentioned Langer Patent 2,460,460. When incorporated in such a machine, sealing and pressure members 9 and 20 may be reciprocated with respect to each other by means of a mechanism provided for the purpose, to apply pressure upon a pair of layers of thermoplastic film, 23 and 24, interposed therebetween. Heater element 15, maintained under constant tension, has its ends 25 and 26 electrically connected to a source of current pulses, thereby to intermittently energize and to heat the same to sealing temperatures in timed relation with respect to the operation of the reciprocating mechanism. For reasons of clarity of illustration, these auxiliary devices, such as the reciprocating mechanism, the source of current pulse and the means for tensioning the heater element, have not been shown in the drawing, particularly as they are well known to those skilled in the art and do not form part of the present invention.

When it is desired to heat seal a pair of thermoplastic layers 23 and 24, the layers are inserted between sealing member 9 and pressure member 20 and the said members are displaced toward one another by the reciprocating mechanism, applying pressure upon the region of the layers to be heat sealed. A short pulse of sealing current of suitable intensity is then passed through heater element 15 and will heat up the said element to a high temperature practically instantaneously. The heat thus generated in the heater element will be transmitted through the thickness of upper insulating layer 16 and will cause heat sealing of layers 23, 24 in a region corresponding to a longitudinally extending central region of the sealing device. A short period thereafter, the sealing heat produced by the short pulse of current is dissipated and the seal formed is allowed to cool and to consolidate while the pressure upon the seal is still maintained. Finally, the pressure is released and the sealed layers are withdrawn. To further reduce adherence or sticking of the sealed region of the thermoplastic layers to the operating face of the sealing member, it is preferred to form the top insulating layer 16 of a material having non-sticking characteristics, a thin fabric woven of glass fibers (Fiberglas) impregnated or coated with tetra-fluoro-ethylene (Teflon) being very satisfactory for the purpose.

Considering now the operating or sealing face of the sealing device constituted by insulating layer 16, it will be noted (see Fig. 3) that this face has three different temperature zones. Zone A, corresponding to the longitudinal center region of the face directly overlying groove 11, will be heated to the highest temperature, since the corresponding region of the heater element 15 will lose the least amount of heat by conduction into the underlying metal base 10 of high heat conductivity. Zones B, extending longitudinally at both sides of Zone A, will be heated to considerably lower temperatures due to the fact that an appreciable portion of the heat generated in the corresponding regions of the heater element 15 will be dissipated by conduction through the underlying lower insulating layer 14 into base 10. Finally, zones C, constituting the remainder of the sealing face of the device, are hardly heated at all since they are not in direct heat conducting relation with the underlying heater element. The function of zones C is merely to apply pressure to the thermoplastic layers at both sides of the sealing region, thereby preventing wrinkling of the layers. In Fig. 3, the relative thicknesses of the several layers have been greatly exaggerated for reasons of clarity so that it would appear that appreciable hollow spaces 27 are present between zones C of the upper insulating layer 16 and the lower insulating layer 14. This condition, however, is not present in a practical sealing device, due to the very limited thickness of the heater element and due to the slight compressibility of the upper and lower insulating layers. However, spaces 27 may be filled out with narrow strips of heat-resistant insulation of suitable thickness where extreme uniformity of the sealing face is desired.

I have found that the described heat distribution in the operating face of my device provides very important advantages. By proper adjustment of the intensity and duration of the sealing pulse of current, it can be readily accomplished that only zone A of the sealing face is heated to a temperature sufficient to cause heat sealing of a corresponding region of the thermoplastic layers with which it is in contact. Zones B, while heated to some extent, will not cause heat sealing but serve to produce a transition region to avoid abrupt changes in temperature between the heat sealed region and the adjoining regions of the layers. Zones C, which are substantially unheated are effective in maintaining confining pressure upon the layers and, in cooperation with zones B, prevent wrinkling of the plastic layers in the regions adjoining the seam.

While zones A, B and C are not sharply defined, widely different temperatures can co-exist in the different zones of the same substantially plane sealing face due to the fact that the heating pulse of current is too short to permit appreciable spreading of the heat in the plane of insulating layer 16. I have found that the operating conditions inherently following from the structure of my novel sealing member are ideal for producing seals of excellent strength and uniformity in most thermoplastic films. Also, the withdrawal of residual heat into the underlying metal base is quite effective and, as zones A, B and C of the sealing face are in substantially the same plane, no extrusion of the plastic layers will take place in or adjoining the seam, thus removing the two most important causes of sticking.

Obviously, the dimensions of the several structural elements constituting my improved sealing device may vary considerably in accordance with the particular application for which the device is intended. In a practical and commercially acceptable sealing member embodying the invention, base 10 was an aluminum bar ½" wide and 1" high, having a groove milled in the center of the top face thereof which was 3/64" wide and 1/16" deep. Insulating layers 14 and 16 were made of Teflon-impregnated Fiberglas fabric having a thickness between 0.005" and 0.01". Heater element 15 was in the form of a strip of Nichrome ⅛" wide and having a thickness between 0.004" and 0.005". Of course, the length of the base 10 and of the other elements associated therewith is determined by the maximum length of the seal that is to be produced.

Although the present invention has been described in connection with a preferred embodiment thereof, variations and modifications may be resorted to by those skilled in the art without departing from the principles outlined in the foregoing. I consider all of these variations and modifications to be within the true spirit and scope of the present invention, as disclosed in the foregoing description and defined by the appended claims.

I claim:

1. A sealing member for heat sealing machines comprising, in combination, a metal bar having a groove longitudinally extending in its operating face, a layer of heat-resistant insulation on said face, and a heater element in the form of a strip of metal on said layer of insulation and overlying said groove with its edges extending beyond the corresponding edges of the groove, said groove being effective to restrict the heat exchange between said bar and the portion of said strip of metal directly above the groove.

2. A sealing member for heat sealing machines of the thermal impulse type comprising, in combination, a bar of high heat conductivity metal having a longitudinally extending groove in its operating face, a layer of heat-resistant insulation on said face, and a heater element in the form of a strip of metal of high specific resistivity tensioned on said layer of insulation and overlying said groove with its edges extending a substantially uniform distance beyond the corresponding edges of the groove, the longitudinal center region of said heater element directly above said groove being in greatly restricted heat exchange relation with said bar and the lateral marginal portions of said heater element being in intimate heat exchange relation with said bar whereby upon passage of a pulse of electric current through said heater element the said center region thereof will be heated to a higher temperature than the said marginal portions thereof.

3. A sealing member for heat sealing machines of the thermal impulse type comprising, in combination, a metal bar having a longitudinally extending groove in its pressure-applying face, a thin layer of insulation on said face, and a metal heater strip on said layer of insulation and overlying said groove, said strip being wider than said groove so that its lateral marginal portions extend beyond the groove into heat exchange relation with the bar through the thickness of the underlying layer of insulation whereby upon the passage of a sealing pulse of current through the heater strip the longitudinal center region of said strip directly above the groove will be heated to heat sealing temperature and the laterally adjoining regions of the said strip will be heated to lower temperatures.

4. A sealing member for heat sealing machines of the thermal impulse type comprising, in combination, a bar of high heat conductivity metal having a longitudinally extending groove in its pressure-applying face, a first layer of heat-resistant insulation on said face, a heater strip of high resistivity metal on said layer of insulation and overlying said groove with its edges extending beyond the corresponding edges of the groove, and a second layer of heat-resistant insulation overlying said strip and said first layer of insulation and constituting the operating and sealing face of the member, said groove being effective to restrict the heat exchange between said bar and the portion of the heater strip directly above the groove whereby upon passage of a pulse of electric current through said heater strip the corresponding portion of said operating face will be heated to a higher temperature than the remainder of said face.

5. A sealing member for heat sealing machines of the thermal impulse type comprising, in combination, a metal bar having a longitudinally extending groove in its pressure-applying face, a first layer of insulation on said face, a metal heater strip on said layer of insulation and overlying said groove, said strip being substantially wider than said groove so that its lateral marginal portions extend an appreciable distance beyond the edges of the groove, and a second layer of insulation overlying said strip and said first layer of insulation and having its lateral terminal regions secured to the sides of the bar, the portion of said second layer of insulation extending in substantial parallelism with the pressure-applying face of the bar constituting the operating and sealing face of the sealing member, said groove being effective to restrict the heat exchange between said bar and the portion of the heater strip directly above the groove whereby upon passage of a pulse of electric current through said heater strip the corresponding portion of said operating face will be heated to a higher temperature than the remainder of said face.

6. A sealing member for heat sealing machines of the thermal impulse type comprising, in combination, a bar of high conductivity metal having a longitudinally extending groove in its pressure-applying face, a first layer of heat-resistant insulation on said face, a heater strip of high resistivity metal tensioned on said layer in overlying relation with respect to said groove and with its side edges extending beyond the corresponding edges of the groove, a second layer of heat-resistant insulation overlying said first layer of insulation and the heater strip thereon, and means for securing said second layer of insulation to said bar, said second layer of insulation constituting the operating and sealing face of the sealing member whereby upon the passage of a pulse of current of suitable intensity through said heater strip the center zone of the sealing face aligned with the groove will be heated to sealing temperature, the two adjacent zones of said face aligned with the remainder of said strip will be heated to lower temperatures, and the two zones constituting the rest of the said face will be substantially unheated.

References Cited in the file of this patent

UNITED STATES PATENTS

| | | |
|---|---|---|
| 1,204,418 | Drucklieb | Nov. 14, 1916 |
| 2,468,629 | Herzig et al. | Apr. 26, 1949 |
| 2,480,794 | Waggoner | Aug. 30, 1949 |
| 2,509,439 | Langer | May 30, 1950 |
| 2,574,094 | Fener et al. | Nov. 6, 1951 |
| 2,574,095 | Langer | Nov. 16, 1951 |
| 2,621,704 | Langer | Dec. 16, 1952 |
| 2,725,091 | Miner et al. | Nov. 29, 1955 |
| 2,796,913 | Fener et al. | June 25, 1957 |
| 2,859,796 | Taunton | Nov. 11, 1958 |